United States Patent [19]
Hashimoto et al.

[11] Patent Number: 5,971,399
[45] Date of Patent: Oct. 26, 1999

[54] DUAL DENSITY SANITARY PIPE GASKET

[75] Inventors: Yoshihito Hashimoto, Yokohama; Takahisa Ueda, Sanda; Takashi Murakami, Tokyo, all of Japan

[73] Assignees: Chiyoda Corporation; Nippon Pillar Packing Co., Ltd., both of Japan

[21] Appl. No.: 08/851,277

[22] Filed: May 5, 1997

Related U.S. Application Data

[63] Continuation-in-part of application No. 08/107,087, Aug. 17, 1993, abandoned.

[51] Int. Cl.$^6$ .............................. F16L 17/06; F16L 21/02; F16L 33/16
[52] U.S. Cl. .......................... 277/314; 277/612; 277/614; 277/626; 277/627
[58] Field of Search ...................................... 277/314, 612, 277/614, 626, 627; 285/910, 405, 406, 423; 264/319

[56] References Cited

U.S. PATENT DOCUMENTS

| | | | |
|---|---|---|---|
| 2,789,844 | 4/1957 | Kessler | 285/336 |
| 3,837,657 | 9/1974 | Farnam et al. | 277/1 |
| 3,854,736 | 12/1974 | Farnam . | |
| 3,953,566 | 4/1976 | Gore | 264/288 |
| 4,187,390 | 2/1980 | Gore | 174/102 R |
| 4,489,031 | 12/1984 | Ogihara | 264/319 X |
| 4,762,657 | 8/1988 | Rogers et al. | 264/83 |
| 4,865,653 | 9/1989 | Kramer | 204/381 |
| 5,112,664 | 5/1992 | Waterland | 428/76 |
| 5,492,336 | 2/1996 | Barna et al. | 277/314 |
| 5,749,586 | 5/1998 | Abe et al. | 277/627 X |

FOREIGN PATENT DOCUMENTS

| | | |
|---|---|---|
| 63242610 | 10/1988 | Japan . |
| 245594 | 12/1990 | Japan . |

OTHER PUBLICATIONS

ISO–2852, Second Edition Jun. 15, 1993.

*Primary Examiner*—James R. Brittain
*Assistant Examiner*—Gary Grafel
*Attorney, Agent, or Firm*—Lorusso & Loud

[57] ABSTRACT

A sanitary-pipe gasket includes an annular disk portion of predetermined thickness, and a projecting portion which is provided concentrically with the annular disk portion on each of the upper and lower surfaces of the annular disk portion. The annular disk portion and the projecting portion of the sanitary-pipe gasket are integrally formed of porous PTFE such that the density of the annular portion ranges from 1.0 to 1.9 g/cm$^3$ and the density of the projecting portion ranges from 0.3 to 1.8 g/cm$^3$. The gasket is produced by disposing a porous PTFE sheet of 0.3 to 1.4 g/cm$^3$ density and 1 to 10 mm thickness in a mold, and applying pressure perpendicular to the sheet at room temperature or with heating. The density of the gasket adjacent the planar surfaces and a peripheral edge surface is substantially higher than the density further inward of these surfaces, and the density adjacent the peripheral edge surface is sufficient to seal the peripheral edge surface against radial flow past the gasket when installed between a pair of flanges.

4 Claims, 7 Drawing Sheets

DUAL DENSITY SANITARY PIPE GASKET

CROSS-REFERENCE TO RELATED APPLICATION

This application is a continuation-in-part of U.S. application Ser. No. 08/107,087 filed Aug. 17, 1993 abandoned and entitled "GASKET FOR SANITARY PIPE."

BACKGROUND OF THE INVENTION

1. Field of the Invention

This invention relates to a sanitary pipe gasket for use in a piping system associated with the manufacture of medicines, foods, etc., and more particularly to a sanitary-pipe gasket which is integrally formed of porous polytetrafluoroethylene.

2. Description of Related Art

Figures 1A, 1B:
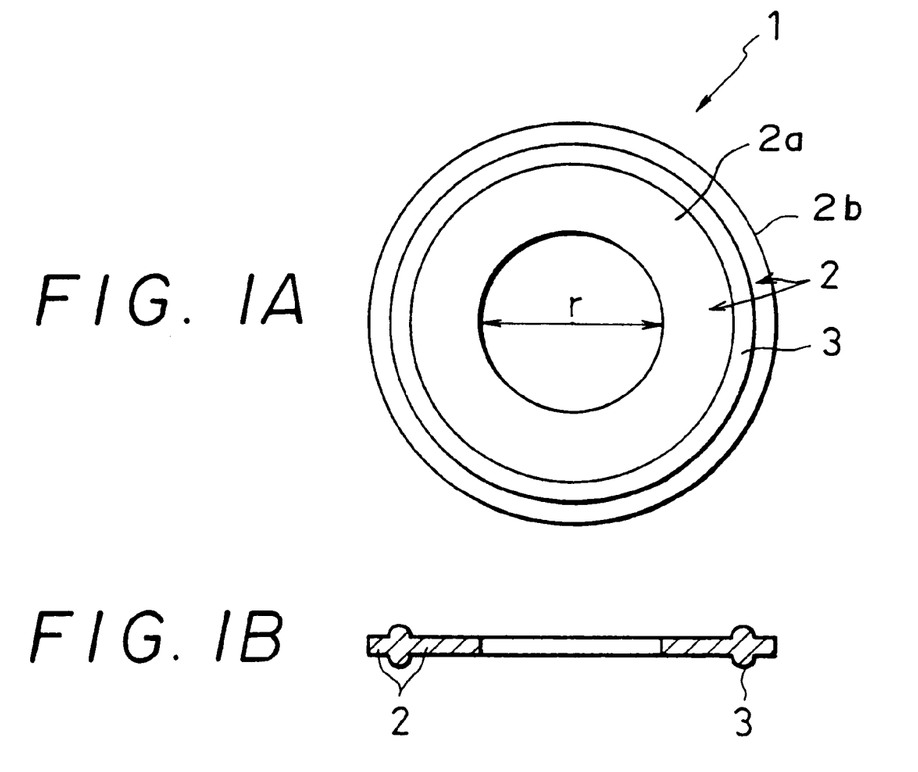
FIG. 1A is a plan view of an embodiment of a sanitary-pipe gasket according to this invention.
FIG. 1B is a cross-sectional view of the gasket of FIG. 1A.
Figure 2:
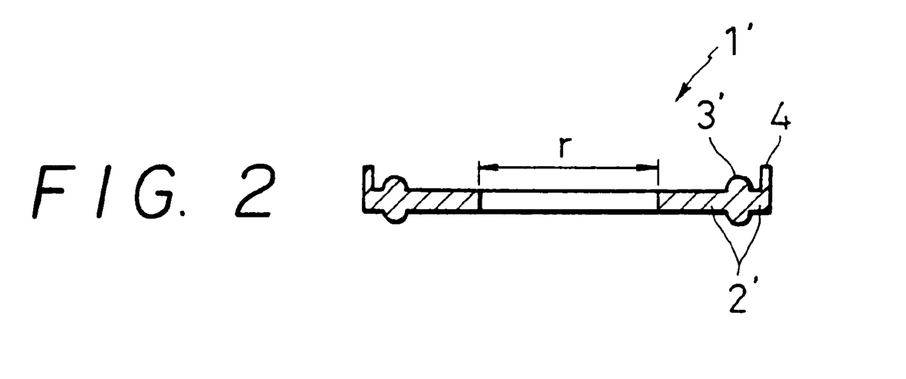
FIG. 2 is a cross-sectional view of another embodiment of a sanitary-pipe gasket according to this invention.

As used herein, "sanitary" has reference to a barrier to contamination of medicines, foods, etc., by substances which adversely affect the living body, for example, foreign matter such as dust, impurities, bacteria, microorganisms, etc. Particularly, in order to provide a sanitary-pipe gasket which satisfies conditions for maintaining purity of contents, the International Organization for Standardization (ISO) provides that a structure having projecting portions 3 and 3' as shown in FIGS. 1 and 2 should be adopted to fix a sanitary-pipe gasket at a proper position so that no trap of liquid or the like occurs inside of the pipe.

As compared to a general use gasket, the material for a sanitary-pipe gasket to be used in manufacturing medicines, foods, etc. must be more carefully selected. This requirement is made to prevent contamination of products by components of the gasket material eluting into the fluid transported through the piping. Accordingly, most sanitary-pipe gaskets have conventionally been formed of silicone rubber which has excellent heat resistance and chemical resistance.

In the manufacture of medicine, etc., product management is strict, and in order to satisfy requirements, the manufacturing apparatus is cleaned at a higher frequency in comparison with apparatus used in other applications. For example, for sanitary apparatus, particularly that used in manufacturing medicines, an alkali cleaning treatment or a cleaning treatment using alkali and saturated vapor are frequently conducted to remove chemicals, microorganisms and pyrogens which would be injurious to a living body.

Silicone rubber which has been conventionally used for gaskets in sanitary piping has excellent acid resistance, however, but not alkali resistance, and, accordingly, there is the possibility that alkali components will remain on the surface of the gasket after the alkali cleaning treatment, thus causing various adverse post-treatment affects. Even when the amount of residual alkali component is very low, there is the disadvantage that the gasket may become fixed to the metal surface of a flange when the device is subjected to a steam disinfection treatment.

A sealing element of polytetrafluoroethylene (hereinafter referred to as "PTFE") resin, which has excellent heat resistance and mechanical resistance and lacks the above disadvantage of the silicone rubber gasket, has been proposed in the form of packing, a gasket, an O-ring and the like, which types of element are applicable, not only to a sanitary apparatus, but also to various other types of apparatus. Such a sealing element of PTFE resin is disclosed, for example, in Japanese Laid-Open Patent Application No. 63-242610 and No. 62-21819. Further, a sealing member of stretched porous PTFE has also been disclosed in Japanese Utility Model Publication No. 2-45594.

However, there has not yet been disclosed a gasket for a sanitary pipe (a pipe for sanitary apparatus) used in the production of medicine products, food products, etc., for which strict checking for the presence of eluted components as impurities in the products is required and repetitive cleaning under severe conditions is indispensable.

In attempting to develop a gasket suitable for a sanitary pipe, the inventors of this application tried various kinds of materials, and through these attempts, the inventors produced a sanitary-pipe gasket using PTFE resin, which has excellent alkali resistance, as a substitute for the conventional silicone rubber. However, since PTFE resin has higher rigidity than silicone resin, gas leakage through the gasket is liable to occur through gasket. As a consequence, the flanges are required to be tightened under higher pressure. In addition, flanges, once closely tightened against the gasket, are difficult to closely tighten again, and thus the prevention of gas leakage becomes extremely difficult. This is because of low elastic recovery of the PTFE gasket.

SUMMARY OF THE INVENTION

An object of this invention is to provide a gasket for a sanitary pipe which has excellent chemical resistance, particularly alkali resistance, and can retain its sealing capability for a long term with excellent elastic recovery.

In order to attain the above object, the present invention provides a sanitary-pipe gasket which comprises an annular disk member of predetermined thickness, and a projection portion which is provided concentrically with the annular disk member on each of the upper and lower surfaces of the annular disk member, wherein the annular disk portion and the projection portion of the sanitary-pipe gasket are integrally formed of porous PTFE such that the average density of the annular portion ranges from 1.0 to 1.9 g/cm$^3$ and the average density of the projection portion ranges from 0.3 to 1.8 g/cm$^3$.

The average density of the annular portion preferably ranges from 1.2 to 1.9 g/cm$^3$, and the thickness of the annular disk portion preferably ranges from 0.8 to 8 mm.

The sanitary-pipe gasket according to this invention is obtained as follows. First, the annular disk member is formed with a concentric space at its center and with a predetermined thickness. Subsequently, a porous PTFE sheet having a density of 0.3 to 1.8 g/cm$^3$ and a thickness of 1 to 10 mm is disposed on each of the upper and lower surfaces of the annular disk member in a concentric and annular arrangement in a mold, and the whole is then pressed together at room temperature or with heating to fix a projection on each of the upper and lower surfaces of the annular disk member.

The annular disk portion and the projection portion are integrally formed of porous PTFE, with the annular disk portion having an average density of 1.0 to 1.9 g/cm$^3$ and the projection portion having an average density of 0.3 to 1.8 g/cm$^3$, so that when the sanitary-pipe gasket of this invention is applied to a joint such as a ferrule, a flange or the like, for a connection in a sanitary pipe system, the projection portion of the sanitary-pipe gasket can be easily secured within a recess of the joint with highly accurate positioning.

Further, because the annular disk portion is porous and has an average density of 1.0 to 1.9 g/cm$^3$ and excellent elasticity, fluid flowing in a pipe system is prevented from penetrating into the gasket due to its water repellency. In addition, the same effect prevents the gasket from adhering to the contact surface of the ferrule, the flange or the like. Therefore, unlike the conventional silicone rubber gasket, there is no possibility that the gasket will adhere to the contacted metal surface of the ferrule or the like, even after the alkali cleaning treatment.

Furthermore, the gasket according to this invention is porous, and thus has sufficient elasticity. Therefore, the recovery of elasticity is excellent, even after repetitive use and the shape recovery is high, so that a tight seal with the gasket can be reproduced, even after retightening plural times. Therefore, the integrity of the seals of the sanitary pipe system to which the gasket of this invention is applied can be improved.

As a result of compression of the porous blank within a radially and axially confined space, preferential densification occurs adjacent the circumferential surfaces (edges) and planar surfaces of the gasket with sealing of the porous structure at the gasket surfaces. This high densification of the gasket, especially at the edges, serves to eliminate porosity at the edges and surfaces and to prevent fluid flow radially through the gasket when installed between a pair of flanges. Densification at the radially inner and outer edges also makes the gasket less susceptible to cold flow in repeated use.

Furthermore, the gasket according to this invention avoids impurities from being eluted into apparatus for producing medicine, etc., and thus it is suitably used as a sealing element for connecting pipe flanges, etc., of such apparatus. In addition, it has excellent heat resistance and excellent chemical resistance against chemicals such as acids and alkalis, and also has high elasticity and excellent recovery against compression, so that it can stably prevent the leakage of gas.

DETAILED DESCRIPTION OF THE INVENTION

As shown in FIGS. 1 and 2, a sanitary-pipe gasket 1 (1') having an annular disk shape according to this embodiment comprises an annular disk portion 2 (2'), and a projection portion 3 (3') which is provided concentrically and annularly on each of the upper and lower surfaces of the annular disk portion 2 (2') . As described above, such a structure is required for a gasket for a sanitary pipe by the International Organization for Standardization (ISO). Accordingly, the projection portions 3 (3') are disposed in position to mate with the recesses in the flanges. The diameter r of a hole formed at the center of the annular disk portion 2 (2') should be substantially identical to the inner diameter of the flange in order to prevent trapping of liquid chemical in the apparatus. As further shown in FIG. 1, annular projection 3 divides the annular disk portion 3 into inner annular section 2a and outer annular section 2b, with annular projection 3 and inner and outer sections 2a and 2b being mutually concentric.

The gasket 1' as shown in FIG. 2 has the same construction as the gasket 1 as shown in FIG. 1, except that a lip 4 is provided at the outer peripheral edge of the gasket 1' to temporarily fix the gasket to the flange.

The thickness of the annular disk portion, after the sanitary-pipe gasket as described above is formed, is ordinarily 0.1 to 8 mm, preferably 0.5 to 5 mm, although thickness is not defined by the International Organization for Standardization (ISO).

The porous PTFE of this invention can be made using a well-known method. Suitable methods for forming porosity include sheet stretching, extrusion stretching, combustible filler burning and removal, sintering, etc.

In the sheet stretching method, a PTFE sheet is stretched in its longitudinal direction at a temperature above 300° C. and below its melting point while maintaining the original width and thickness of the sheet to thereby induce crazing in the PTFE sheet, and then it is subjected to a heat treatment. In the extrusion stretching method, a mixture of raw PTFE and liquid lubricant such as solvent naphtha, petroleum or the like is extruded, and then subjected to the same stretching treatment as described above. In the combustible filler burning and removing method, raw PTFE material is admixed with a combustible filler, and then burned to remove the combustible filler, thereby making the PTFE porous. Finally, in the sintering method, fibrous PTFE is sintered to make a porous structure.

In order to prevent impurities from being eluted into the reactants or other material in an apparatus for which a sanitary-pipe gasket is used, the porosity is preferably made without addition of inorganic material or addition of copolymer, unlike the conventional process for manufacturing a gasket for general use.

The porous PTFE constituting the sanitary-pipe gasket according to this invention has a density of 1.0 to 1.9 $g/cm^3$ (percentage of voids is 12 to 50%) in the annular disk portion, and a density of 0.3 to 1.8 $g/cm^3$ (percentage of voids is 16 to 86%) in the projection portion. If the annular disk portion has a density lower than 1.0 $g/cm^3$, susceptibility to penetration is increased. On the other hand, if the density exceeds 1.9 $g/cm^3$, the elasticity is reduced and conformability of the gasket upon clamping is reduced. If the density of the projecting portion is lower than 0.3 $g/cm^3$, it is difficult to maintain the shape of the projecting portion, and thus difficult to positionally fix it within the joint. For securing its position, the density of the projecting portion is preferably above 0.6 $g/cm^3$.

The density of the hook 4 of the gasket 1' as shown in FIG. 2 is not limited to a specific value, and it may be substantially equal to the density of one of the projecting portion 3' and the annular disk portion 21 in accordance with the method of manufacture.

The method of manufacture of the sanitary-pipe gasket as described above is not specifically limited. However, it is preferably formed as follows. That is, porous FTFE having a density corresponding to that of the projecting portion of the gasket is heated in a mold which is so designed that the porous PTFE is shaped into the above structure, and locally pressed to form the annular disk portion of porous PTFE having the density higher than the projecting portion.

Pipes for a sanitary apparatus are connected using the sanitary-pipe gasket of this invention by engaging the projecting portion of the gasket within the recess of a joint connecting portion, such as a flange or the like as described above, and then sealed by clamping it with a ferrule, a flange or the like to prevent leakage of the fluid material from the pipes to the exterior.

Typically, various kinds of chemical liquids such as physiological active material, injection medicine, etc., will flow in the thus-connected piping system of a sanitary apparatus, usually at widely varying temperature and pressure ranges of 4 to 60° C. and 0.5 to 10 kg/cm$^2$ (absolute pressure), in the process of manufacturing medicine, food, etc.

In a piping system which has joints sealed using the gasket of this invention, when a chemical liquid flows through the piping system under the above conditions, this liquid is sealed against leakage to the outside and against invasion of impurities from outside the piping system, and no component is eluted into the flowing liquid from the gasket disposed within a joint. That is, contamination of the liquid flowing through the piping system by impurities can be completely prevented.

Product management requires strict cleaning of the inside of the piping system for a sanitary apparatus at conclusion of manufacturing a product, and thus the piping system is subjected to a cleaning treatment under severe conditions, for example, at a temperature of 10 to 60° C. with 0.1 to 10 wt. % alkali solution, saturated vapor, combination of the alkali solution and the saturated vapor, nitric acid or the like. Such a cleaning treatment can be favorably carried out for the pipe system which is jointed using the gasket of this invention, and the cleaning liquid and/or gas can be closely and tightly sealed within to prevent leakage to the exterior of the pipe system. The gasket of this invention is not damaged by the cleaning treatment, and thus another manufacturing process can be carried out immediately following the cleaning treatment.

Next, preferred embodiments of this invention will be described in detail, however, this invention is not limited to these embodiments.

EXAMPLE 1
(Production of Sanitary-pipe gasket)

PTFE was subjected to crystal orientation using a pressure roller, and then stretched 110 to 300% in its longitudinal direction at a temperature lower than 327° C., using a rubber-coated pinch roller, to obtain porous PTFE sheets having various percentages of voids ranging from 40% to 86% (various densities).

Figure 3:
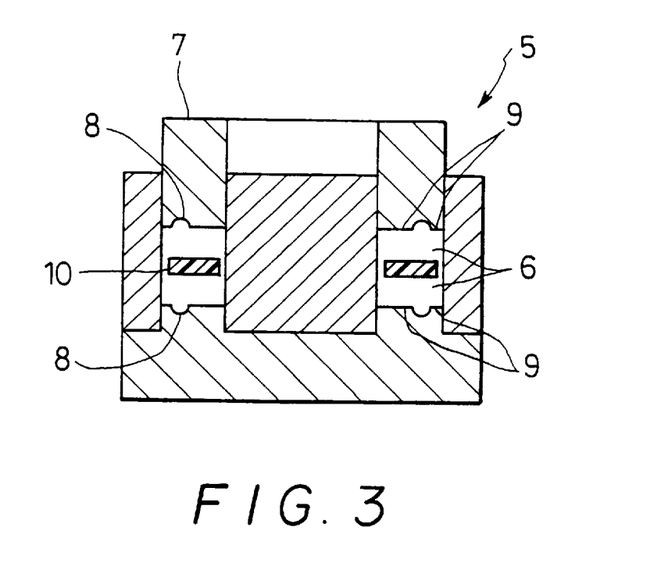
FIG. 3 is a cross-sectional view of a mold which is used to produce the sanitary-pipe gasket of this invention.

A mold 5 having an annular-disk shaped space 6 at the central portion thereof, as shown in FIG. 3, was next used. The mold space 6 had an inner diameter of 23.2 mm, an outer diameter of 50.5 mm and a thickness of 20 mm. The mold 5 was formed with recess portions 8, corresponding to the projection portions of the gasket, at positions confronting the mold space 6. As shown in FIG. 3, each porous PTFE sheet 10 disposed in the mold space 6 was heated to 150° C. by heating the mold 5, and was then pressed by upper side portion 7 of the mold 5 under a hydraulic pressure of 200 kg/cm$^2$ to 600 kg/cm$^2$. As a result, a porous PTFE sheet was formed in correspondence with the shape of the recess portions 8, and at the same time the porous PTFE within the mold 5 in areas corresponding to the annular disk portion 9 was densified.

Figure 7:
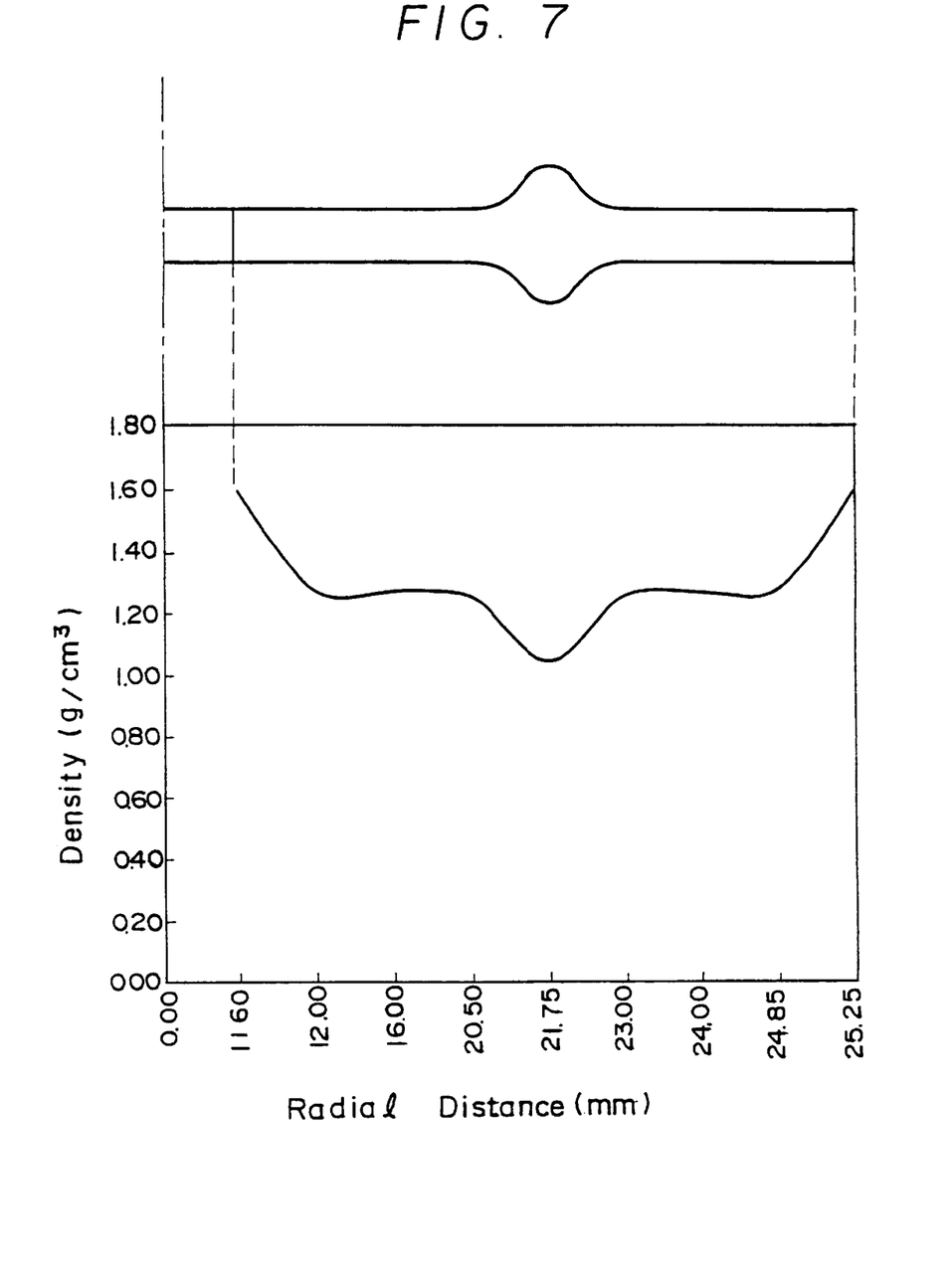
FIG. 7 is a graph showing the density profile of a gasket according to the present invention.

In applying a hydraulic pressure of 200–600 kg/cm$^2$, the confined space of the mold is first filled and, subsequently, the annular disc portions of the molded gasket become densified to an extent that their average density becomes 0.2–0.7 kg/cm$^2$ greater than that of the porous polytetrafluoroethylene within the annular projection. It has been found that, in producing such a density differential between the annular projection and the flat surface portions of the gasket, the surface and edge portions of the molded gasket are preferentially densified to an extent whereby they are suitably sealed against radial fluid flow (permeation) when installed between a pair of flanges. This density gradient is shown in FIG. 7. The radial dimension of the densified edge portions produced in this example was about 2 mm.

In each of the sanitary-pipe gaskets thus produced, the density of the projection portions 8 (corresponding to the recess portions 8 of the mold 5) was substantially equal to that of the pre-molded porous PTFE sheet, that is, 0.3, 0.6, 1.0, 1.2, 1.4, 1.7 g/cm$^3$, whereas the average density of the annular disk portion was increased to 1.0, 1.2, 1.3, 1.4, 1.8, 1.9 g/cm$^3$. Accordingly, various sanitary-pipe gaskets which were different in density as between the annular disk portion and the projecting portion and had the shape as shown in FIG. 1 were obtained.

EXAMPLE 2

Figure 4:
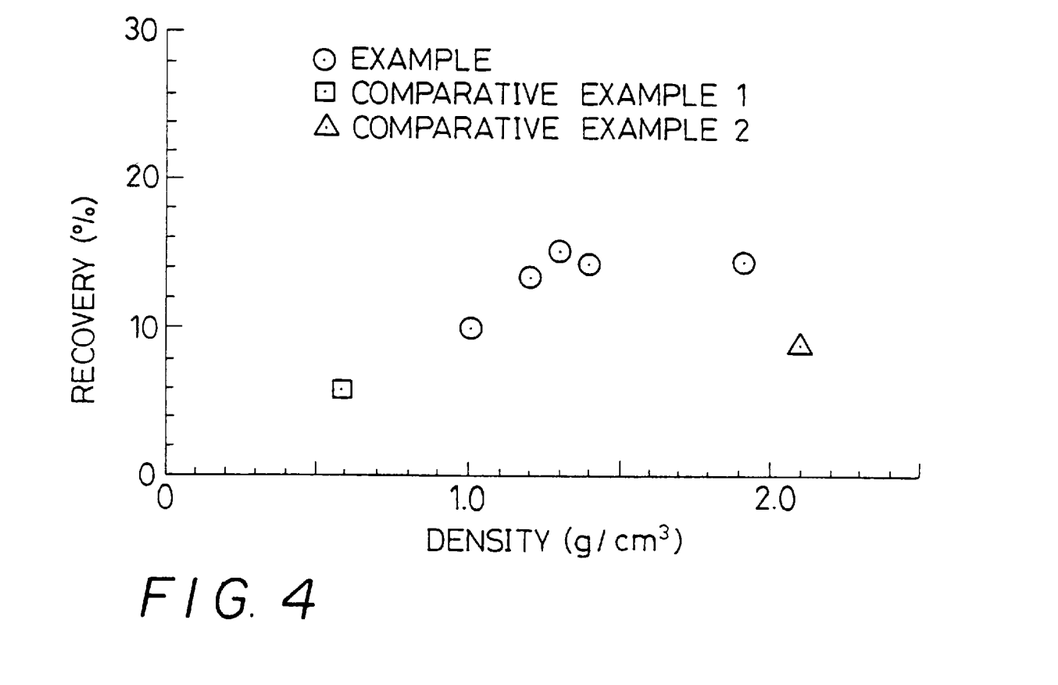
FIG. 4 is a graph showing the relationship between the density of an annular disk portion of the sanitary-pipe gasket of this invention and the recovery from compression caused by pressure to the plan surface.

Using each of the sanitary-pipe gaskets obtained in embodiment 1, the compression recovery of the annular disk portion of each sanitary-pipe gasket was measured using an Amsler's testing machine with the clamping pressure set to 300 kg/cm$^2$. The results are shown in FIG. 4 in which the relationship between the recovery of the gasket and the density is plotted. As is apparent from FIG. 4, the gaskets of this embodiment showed a recovery of 10 to 16%, with the best result obtained for the disk portion having the density above 1.2 g/cm$^3$.

COMPARATIVE EXAMPLE 1

A porous PTFE sheet having a void percentage of 90% was formed in the same manner as in example 1, and a sanitary-pipe gasket having projection portions of about 0.25 g/cm$^3$ in density and an annular disk portion of 0.6 g/cm$^3$ in density was obtained using the above porous PTFE in the same manner as in example 1.

The compression recovery of the annular disk portion of the sanitary-pipe gasket thus formed was measured in the same manner as in example 2, and the result is shown in FIG. 4. As is apparent from FIG. 4, the recovery is a smaller value, 6%, and the gasket after the measurement was greatly deformed.

COMPARATIVE EXAMPLE 2

In place of the porous PTFE sheet of example 1, the PTFE raw material which was used to form the porous PTFE sheet in example 1 was heated and melted at 380° C. using the same mold as used in example 1 to obtain a PTFE gasket having the same shape as that of example 1. Both the projection portion and the annular disk portion of the PTFE gasket thus formed had a density of about 2.1 g/cm$^3$. The compression recovery of this gasket was measured in the same manner as in example 2, and the result is shown in FIG. 4. As is apparent from FIG. 4, the recovery of the gasket of this comparative example 2 is lower than any gasket obtained in example 1.

EXAMPLE 3

Figure 5:
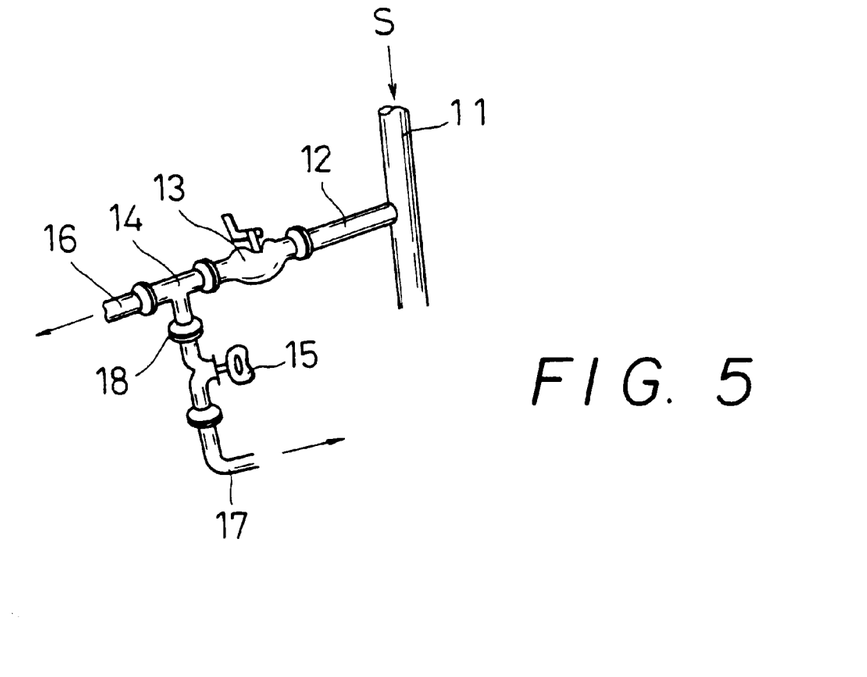
FIG. 5 is a schematic diagram of a pipe system for transport of a saturated vapor, using the first embodiment of this invention.

One-inch sanitary-pipe gaskets having the same shape, each comprising a projection portion of 1.0 g/cm$^3$ in density and an annular disk portion of 1.3 g/cm$^3$ in density, were installed in a piping system for saturated vapor as shown in FIG. 5.

That is, as shown in FIG. 5, a pipe 12 which was branched from a saturated steam supply pipe 11 (shown as "S" in FIG. 5 and FIG. 6) was connected through a ball valve 13 to a T-shaped joint 14. A diaphragm valve 15 was connected to one side of the T-shaped joint 14 while a pipe 16 was connected to the other side of the T-shaped joint 14. The diaphragm valve was further connected to a pipe 17.

In the saturated vapor piping thus constructed, a ferrule having the one-inch gasket as described above was disposed in the joint 18 between the diaphragm valve 15 and the T-shaped joint 14, and vapor at 1.9 kg/cm$^2$ pressure was supplied into the saturated vapor piping at a frequency of two or four times per week and for about two hours at a time. This operation was continued for six months. During this operation, the installed gasket was removed from the piping system, checked and then reinstalled in the same position again every month, and thus re-used repetitively. However, no leakage of the vapor was observed. In addition, no variation or abnormality in shape and outline were observed for the removed gasket.

COMPARATIVE EXAMPLE 3

The saturated vapor was supplied into the piping system in the same manner as in example 3, except that a ferrule having the porous PTFE gasket obtained in the comparative example 1 was mounted in the joint 18.

As a result, the gasket itself had insufficient shape-retention keeping property, and thus forming a good joint was difficult. In addition, the gasket after pressing was deformed by extrusion to the outer and inner sides, so that it was impossible to reuse.

EXAMPLE 4

Figure 6:
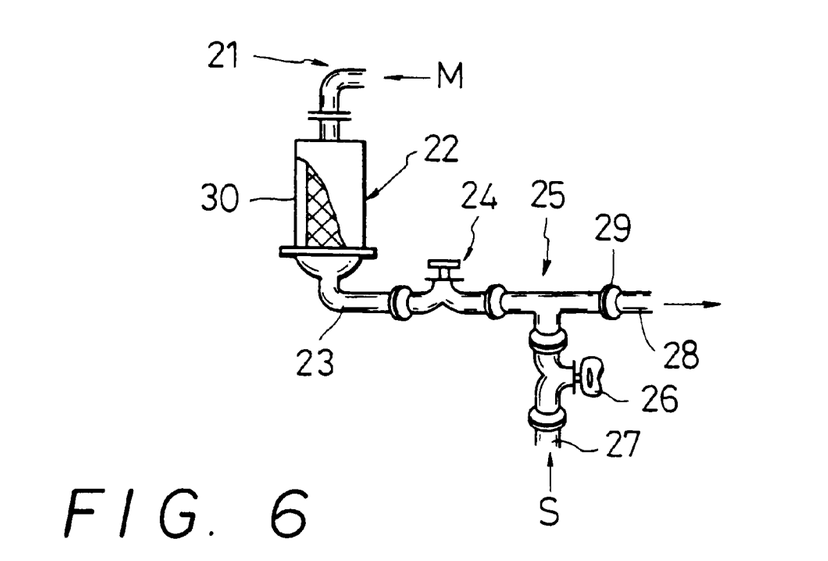
FIG. 6 is a schematic diagram showing a medicine or liquid chemical piping system for use of the gasket of the present invention.

A one-inch sanitary-pipe gasket obtained in example 3 was immersed in alkali solution of 2 wt. % sodium hydroxide for one week, was then washed with water and was then mounted in a joint in a piping system as shown in FIG. 6. In FIG. 6, a filter 22 which was filled with filter medium 30 was connected to a supply pipe 21 for chemical liquid (medicinal liquid) indicated as "M" in FIG. 6) to remove dust, etc., from the chemical liquid, and a pipe 23 connected to the outlet side of the filter 22 was connected through a diaphragm valve 24 to a T-shaped joint 25. A vapor supply pipe 27 was connected to one side of the T-shaped joint 25 through a diaphragm valve 26 while a chemical liquid discharge pipe 28 was connected to the other side of the T-shaped joint 25.

In the piping system thus constructed, a ferrule having the above one-inch sanitary-pipe gasket was disposed at the joint portion 29 between the T-shaped joint 25 and the chemical liquid discharge pipe 28. The piping system was first subjected to an autoclave disinfection treatment using high-pressure saturated vapor, and then the chemical liquid was continuously supplied from the pipe 21 for one hour. No contamination by impurities was observed in the chemical liquid discharged from the piping system.

Thereafter, the gasket was detached from the joint portion 29, immersed in alkali solution, washed with water and then reinstalled in the piping system. This operation was repeated once per week for six months. As a result, even after six months had passed, there was no leakage of vapor, or liquid and no adhesion of the gasket to the ferrule. The gasket after this use retained elasticity and no abnormal deformation was observed. In addition, no contamination of the chemical liquid by impurities was observed.

COMPARATIVE EXAMPLE 4

The PTFE gasket obtained in the comparative example 2 was immersed in alkali solution, washed with water, and then installed in a ferrule in the same manner as the embodiment 4. The ferrule was disposed at the joint portion 29. Thereafter, the autoclave disinfection treatment was conducted, and then chemical liquid was supplied through the piping system.

As a result, abnormal deformation locally occurred in the gasket due to a creep phenomenon, and the gasket did not closely contact the flange surface upon repetitive use, so that leakage of the vapor and the chemical liquid occurred.

COMPARATIVE EXAMPLE 5

In the same manner as in example 4, a commercial silicone-rubber gasket was immersed in alkali solution, washed with water, and then installed in a ferrule. The ferrule was disposed at the joint portion 29. Thereafter, the autoclave disinfection treatment was conducted and the chemical liquid was supplied through the piping system in the same manner as in example 4.

As a result, upon removing the gasket from the joint portion 29 after the first operation as described above, the silicone gasket partially adhered to the ferrule portion of the piping system, and the surface of the gasket was exfoliated. Therefore, the repetitive use was impossible.

EXAMPLE 5

Pressure profile of the gasket planar surfaces

A sanitary gasket having an inner diameter of 23.2 mm$\phi$, an outer diameter of 50.5 mm$\phi$, a nominal size of "is", a thickness of 1.90 mm and a density of 1.90 g/cm$^3$ in the disk portion, (areas shown as "2" in FIGS. 1 and 20, was made from an annular blank of porous PTFE material having a thickness of 10 mm and the density of 0.34 g/cm$^3$ by the method described in Example 1 (hereinafter this is referred to as "this invention's gasket")

A comparative gasket was prepared by using the same porous PTFE material and the method as shown in the U.S. Pat. No. 3,837,657 issued to Farnam et al to make the densities of the bead and disk portions equal to those of this invention's gasket described above. Further, its shape and size were made the same as this invention's gasket by cutting off the portions spread radially by cold flow.

Each of this invention's gasket and the comparative gasket was placed together with a pressure-responsive sheet (trade name "Press Scale" for lower pressure use and showing color changes according to the pressure imposed) manufactured by Fuji-film Corporation between a pair to flanges. The flanges were then tightened to a mean tightening pressure of 10 kgf/cm$^2$, as measured by an Amsler's universal material testing machined.

After tightening the flanges, a pressure profile was determined from variation in the color of the pressure-responsive sheet. Pressure was correlated with density to produce the density profile shown for this invention's gasket in FIG. 7, illustrating how the contacting surface pressure and density vary with radial distance across the flat portions of the gasket.

Figure 8:
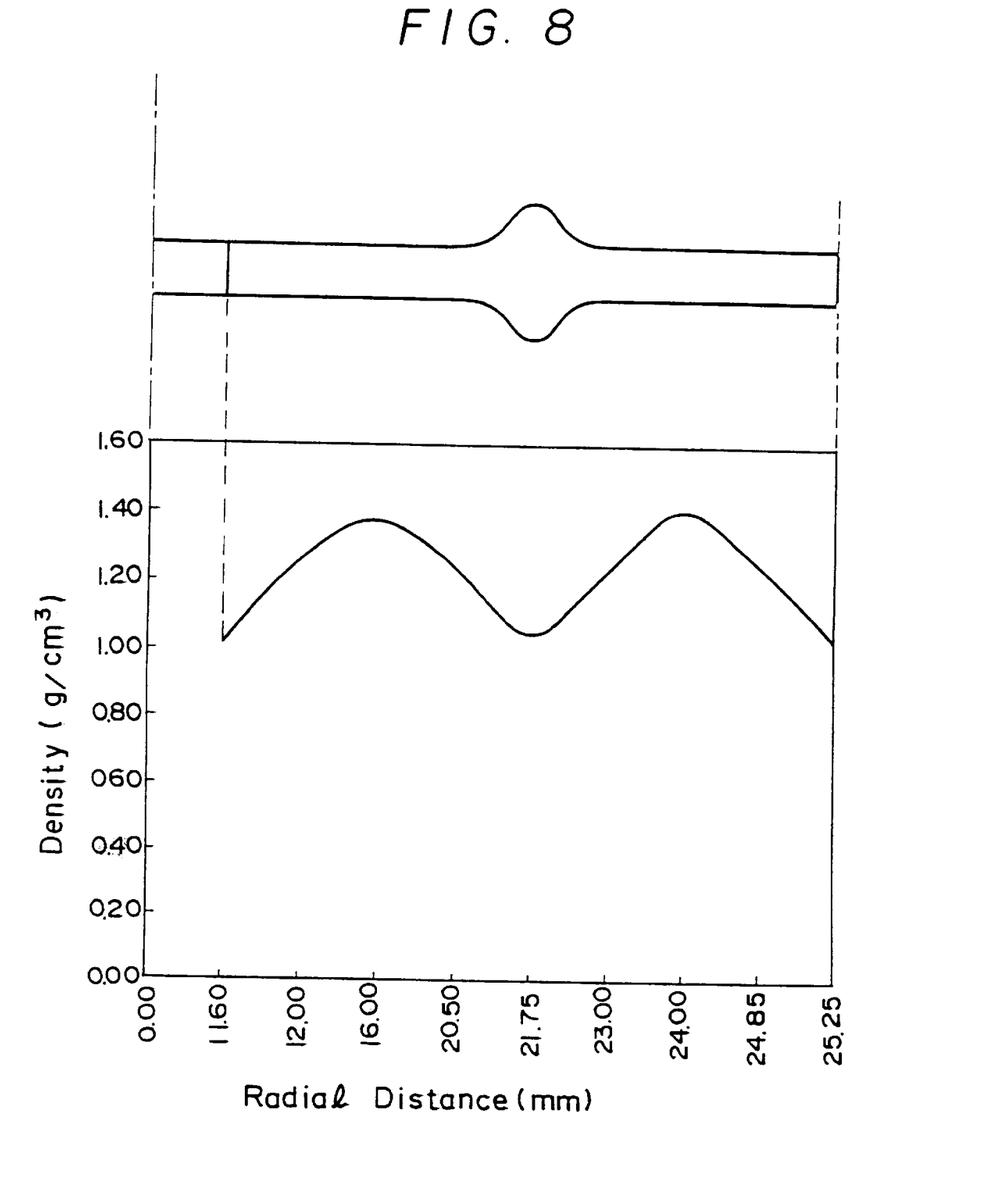
FIG. 8 is a graph showing the density profile of a prior art gasket.

In case of this invention's gasket, it was found that contacting surface pressure is higher at the inner and outer circumferential portions so that the density is accordingly increased within these regions. On the contrary, for the comparative gasket, it was found that the contacting surface pressure was relatively lower at the inner and outer circumferential portions, as illustrated by the density profile of FIG. 8. These findings correlate with the leak test results obtained in Examples 6 and 7 below.

EXAMPLE 6

Relationship between fluid pressure and leakage

Figure 9:
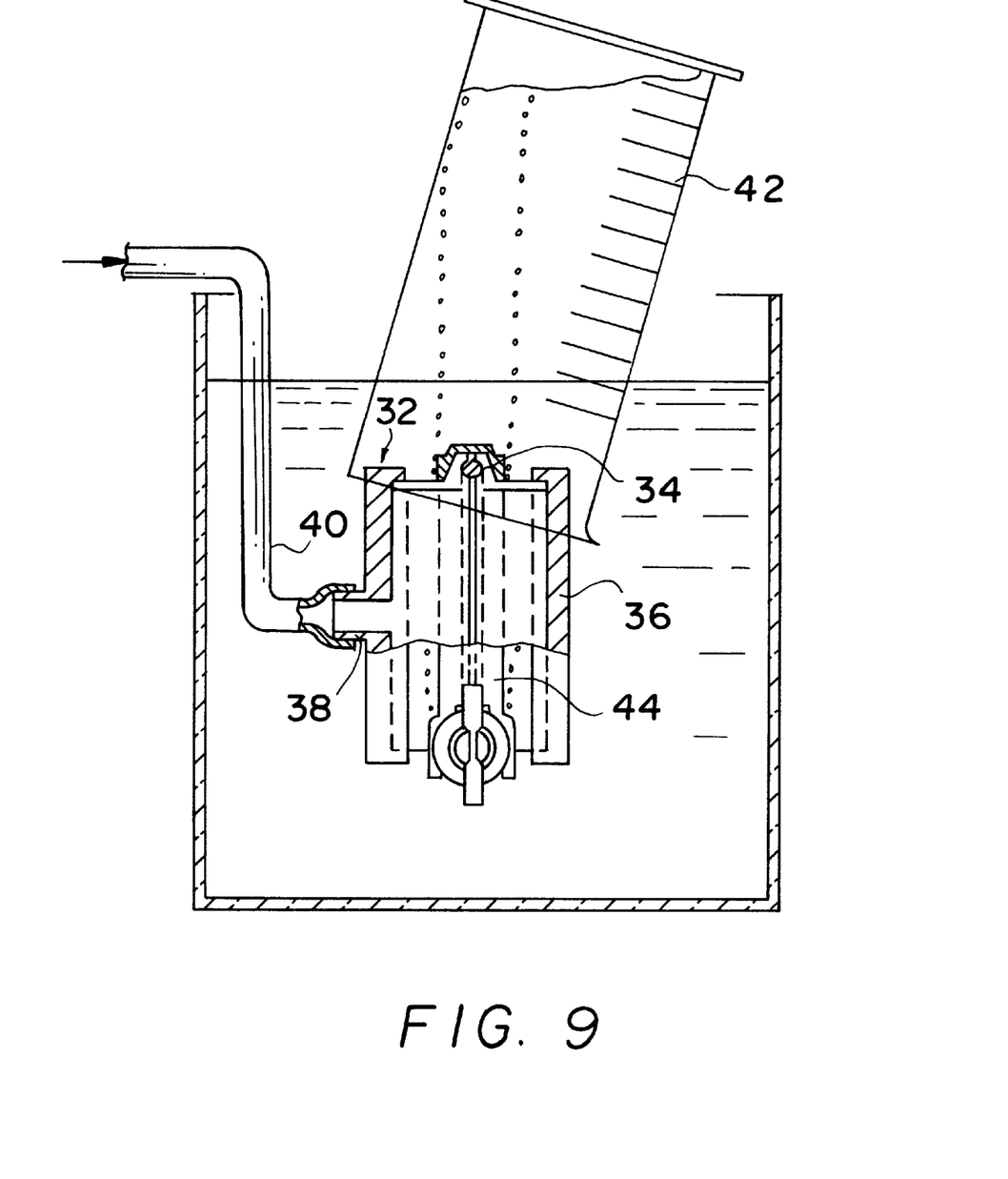
FIG. 9 is a schematic view of the leak testing apparatus used in Example 6.
Figure 10:
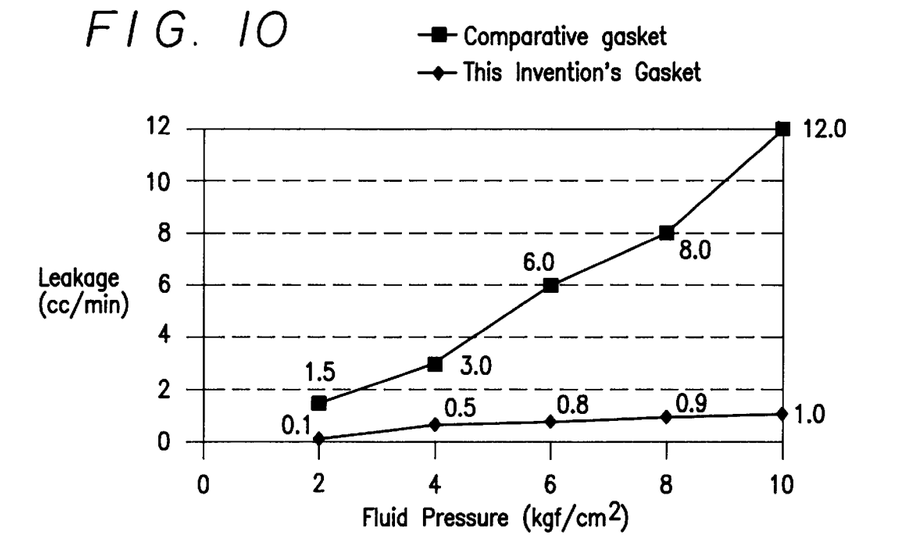
FIG. 10 is a graph illustrating the results of Example 6.

Leakage as a function of fluid pressure was measured for both this invention's gasket and the comparative gasket, both produced as described in Example 5 and installed between a pair of flanges each having an annular groove on the face for sanitary piping system use. The testing apparatus is illustrated in FIG. 9. FIG. 9 shows a pair of flanges 32 submerged in water with a gasket 34 to be tested, wherein one flange pipe end is closed by a stopper 36 and the other 38 is connected to a gas pipe 40 through which nitrogen gas is charged from a nitrogen gas cylinder (not shown) and a measuring flask 42 filled with water is set over the flanges 32 to collect bubbles generated by gas leakage at the ring clamp 44. The testing conditions were as follows:

Gasket Tightening Pressure: 20 kgf/cm$^2$
Charged Fluid: Nitrogen Gas
Fluid Pressure: 2–10 kgf/cm$^2$
Holding Time: 30 minutes for each measurement As shown in FIG. 10, the amounts of leakage from the two gaskets were very different. Specifically, the leakage from this invention's gasket was about one-tenth that of the comparative gasket. In the case of the comparative gasket, the mechanism by which leakage occurred is believed to have involved ingress of the fluid at the inner circumferential surface, permeation through the continuous pore structure of the gasket material and leakage from the outer circumferential surface and/or leakage along the contacting surface between the gasket and flanges, due to less contacting surface pressure at both the inner and outer circumferential portions. These findings indicate a significant structural difference between this invention's gasket and the comparative gasket, specifically in different densities at the inner and outer circumferential edge portions, i.e. a greater density for this invention's gasket in the radially innermost and outermost areas, as compared to the comparative gasket, a difference attributable to differences in molding techniques, i.e. the use of a confined molding space in the present invention.

EXAMPLE 7

Leak test for repeated use

A high temperature steam leak test for a reused gasket was carried our in the following manner:

Gasket Tightening Pressure Between Flanges: 20 kgf/cm$^2$
Charged Fluid: High Temperature (120° C.) Steam and Nitrogen gas
Fluid Pressure: 2 kgf/cm$^2$ After charging high temperature steam into the pipe for contact with the gasket, the gasket was removed from the flanges and subjected to alkaline cleaning. Then, placing the gasket between the flanges again, nitrogen gas was charged to measure the leakage.

Figure 11:
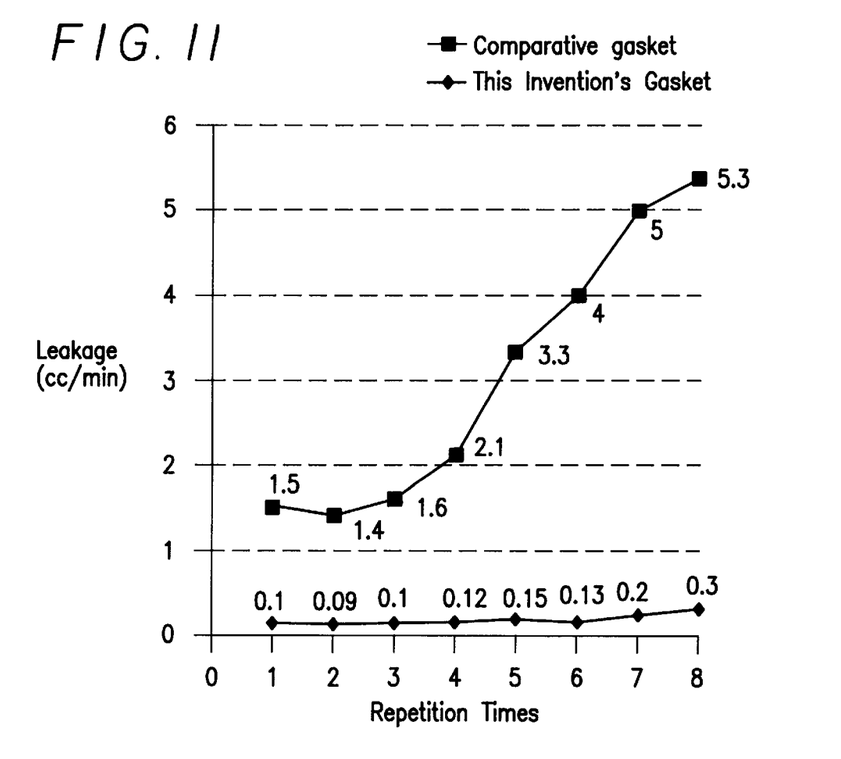
FIG. 11 is a graph illustrating the results of Example 7.

As shown in FIG. 11, great differences in the leakages of the two gaskets were found. The leakage from this invention's gasket was about one-tenth that of the comparative gasket and did not increase with repeated use.

In contrast, leakage from the comparative gasket increased with repeated use, because of its high susceptibility to cold flow (creep in the radial direction).

According to the present invention, since the porous PTFE material's pore (structure) is decreased to enhance the densities within the radially inner and outer circumferential areas, the creep in those areas can be minimized to sustain a higher tightening pressure. Consequently, the sealing at the inner and outer circumferential portions of the gasket is enhanced and creep is avoided to maintain the initial sealing performance even with repeated use.

As is apparent from the comparison between the examples and the comparative examples as described above, the sanitary-pipe gasket according to this invention has high recovery after being subjected to clamping pressure in joint tightening, excellent shape recovery and excellent sealing for a pipe even when it is repetitively used.

Further, the sanitary-pipe gasket according to this invention has durability against hot vapor and alkali, and does not adhere to a joint member even after repetitive cleaning and repetitive use. In addition, there is no contamination by impurities of chemical liquids flowing in the piping system.

On the other hand, the conventional PTFE gaskets and porous PTFE gaskets other than the porous PTFE gaskets of this invention, show poor recovery to the applied pressure, and allow gas leakage after repetitive use. Further, the conventionally-used silicone-rubber gaskets on the market have the disadvantages of adhesion to a joint member and of contamination of the flowing liquid.

What is claimed:

1. A sanitary-pipe gasket for sealing a pipe flange connection against leakage of a fluid carried by the pipe, said sanitary-pipe gasket comprising:

an annular disk portion consisting essentially of porous polytetrafluoroethylene having an average density of 1.0–1.9 g/cm$^3$, having opposing sides with flat surface portions and having inner and outer circumferential edge portions of density higher than said average density and sealed against leakage of the fluid through the porous polytetrafluoroethylene of said annular disk portion; and an annular projection fixed to each of said opposing sides and consisting essentially of porous polytetrafluoroethylene having an average density of 0.2–0.7 g/cm$^3$ lower than the average density of said annular disk portion, said annular projection dividing said annular disk portion into inner and outer sections and wherein said annular projection and said inner and outer annular sections are integrally formed and mutually concentric;

said sanitary-pipe gasket being produced by a process comprising:

placing an annular disk blank of porous polytetrafluoroethylene, having the density of said annular projection, within a radially and axially confined space defined by a mold including a pair of generally planar, annular opposing mold surfaces abutting against an outer mold surface surrounding and perpendicular to said planar mold surfaces and against an inner cylindrical mold surface, each of said opposing mold surfaces having an annular recess corresponding to said annular projection; and pressing said pair of mold surfaces together to compress said annular disk blank, in said flat surface portions, to the density of said annular disk portion.

2. A sanitary pipe gasket as claimed in claim 1 having a density gradient wherein the density adjacent the planar surfaces and a peripheral edge surface shaped by said perpendicular mold surface is substantially higher than the density further inward of said surfaces, the density adjacent the peripheral edge surface being sufficient to seal the peripheral edge surface against radial flow of the fluid post the gasket when installed between a pair of flanges.

3. A method of connecting flanged pipes in a sanitary piping system to prevent ingress into the piping system of foreign matter including dust, bacteria, microorganisms and other impurities, said process comprising:

placing an annular disk blank of porous polytetrafluoroethylene within a radially and axially confined space defined by a mold including a pair of generally planar, opposing mold surfaces abutting against a mold surface surrounding and perpendicular to said planar mold surfaces and against an inner cylindrical mold surface, each of said opposing mold surfaces having an annular recess;

pressing said pair of mold surfaces together to compress said annular disk blank to form a sanitary-pipe gasket comprising an annular disk portion consisting essentially of porous polytetrafluoroethylene having an average density of 1.0–1.9 $g/cm^3$, having opposing sides with flat surface portions and having inner and outer circumferential edge portions of density higher than said average density and sealed against leakage, and an annular projection fixed to each of said opposing sides and consisting essentially of porous polytetrafluoroethylene having a density 0.2–0.7 $g/cm^3$ lower than the average density of said annular disk portion;

cleaning said sanitary-pipe gasket with an alkali;

interposing the cleaned sanitary-pipe gasket between the flanges of the pipes to be connected; and tightening the flanges together with said sanitary-pipe gasket interposed therebetween in order to form a joint sealed against ingress of said foreign matter.

4. A method as claimed in claim 3 wherein said pressing is with a force sufficient to form a density gradient wherein the density adjacent the planar surfaces and a peripheral edge surface shaped by said perpendicular mold surface is substantially higher than the density further inward of said surfaces and to seal the peripheral edge surface to prevent radial flow of the fluid past the gasket when installed between a pair of flanges.

* * * * *